United States Patent
Thorpe et al.

(10) Patent No.: US 6,338,786 B1
(45) Date of Patent: Jan. 15, 2002

(54) GAS-LIQUID SEPARATION METHOD AND APPARATUS IN ELECTROLYTIC CELLS

(75) Inventors: Steven J. Thorpe, Toronto; Raynald G. Lachance, Grand-Mere; Daniel Tapin, Grandmere, all of (CA)

(73) Assignee: Stuart Energy Systems Corporation, Ontario (CA)

( * ) Notice: Subject to any disclaimer, the term of this patent is extended or adjusted under 35 U.S.C. 154(b) by 0 days.

(21) Appl. No.: 09/354,340

(22) Filed: Jul. 16, 1999

(51) Int. Cl.$^7$ .................................................. C25C 1/02
(52) U.S. Cl. ...................... 205/628; 205/633; 205/637; 204/267; 204/269; 204/270
(58) Field of Search .................. 204/267, 269, 204/270; 205/628, 633, 637

(56) References Cited

U.S. PATENT DOCUMENTS

| | | | | |
|---|---|---|---|---|
| 3,652,431 | A | * 3/1972 | Reynolds | 205/338 |
| 4,032,424 | A | * 6/1977 | Peters et al. | 204/258 |
| 4,505,789 | A | 3/1985 | Ford | |
| 4,698,144 | A | * 10/1987 | Wainerdi | 204/257 |
| 5,589,052 | A | * 12/1996 | Shimamune et al. | 205/349 |
| 5,796,799 | A | * 8/1998 | Kobayashi et al. | 376/306 |
| 6,071,401 | A | * 6/2000 | Engel et al. | 205/763 |
| 6,080,290 | A | * 6/2000 | Stuart et al. | 204/269 |

FOREIGN PATENT DOCUMENTS

| | | |
|---|---|---|
| EP | 0043945 | 1/1982 |
| EP | 0427340 A1 | 5/1991 |

* cited by examiner

Primary Examiner—Kathryn Gorgos
Assistant Examiner—Wesley A. Nicolas
(74) Attorney, Agent, or Firm—Manelli Denison & Selter; Edward J. Stemberger

(57) ABSTRACT

An improved method of separating hydrogen gas entrained with a first aqueous electrolytic solution of a water electrolyser for producing said hydrogen and said oxygen gas entrained with a second aqueous electrolyte solution, said method comprising producing a first two-phase flow discharge of said hydrogen gas in said first solution; producing a second two-phase flow discharge of said oxygen gas in said second solution; feeding said first discharge to a first separation chamber having a portion defining a hydrogen chamber to effect separation of said hydrogen gas from said first discharge; feeding said second discharge to a second separation chamber having a portion defining an oxygen chamber to effect separation of said oxygen gas from said second discharge; collecting said hydrogen gas from said hydrogen chamber; collecting said oxygen gas from said oxygen chamber; collecting said first discharge; collecting said second discharge; the improvement wherein at least one of said first discharge is discharged into said hydrogen chamber and said discharge is discharged into said oxygen chamber.

12 Claims, 7 Drawing Sheets

GAS-LIQUID SEPARATION METHOD AND APPARATUS IN ELECTROLYTIC CELLS

FIELD OF THE INVENTION

This invention relates to electrolytic cells, particularly to water electrolytic cells for the production of hydrogen and oxygen and more particularly to methods and apparatus for separating hydrogen and oxygen gaseous products entrained in the aqueous electrolyte solution.

BACKGROUND TO THE INVENTION

Electrosynthesis is a method for the production of chemical reaction(s) that is electrically driven by passage of an electric current, typically a direct current (DC), in an electrochemical cell through an electrolyte between an anode electrode and a cathode electrode from an external power source. The rate of production is proportional to the current flow in the absence of parasitic reactions. For example, in a liquid alkaline water electrolysis cell, the DC current is passed between the two electrodes in an aqueous electrolyte to split water, the reactant, into component product gases, namely, hydrogen and oxygen where the product gases evolve at the surfaces of the respective electrodes.

Water electrolysers have typically relied on pressure control systems to control the pressure between the two halves of an electrolysis cell to insure that the two gases, namely, oxygen and hydrogen produced in the electrolytic reaction are kept separate and do not mix.

In the conventional mono-polar cell design in wide commercial use today, one cell or one array of (parallel) cells is contained within one functional electrolyser, cell compartment, or individual tank. Each cell is made up of an assembly of electrode pairs in a separate tank where each assembly of electrode pairs connected in parallel acts as a single electrode pair. The connection to the cell is through a limited area contact using an interconnecting bus bar such as that disclosed in Canadian Patent No. 302,737, issued to A. T. Stuart (1930). The current is taken from a portion of a cathode in one cell to the anode of an adjacent cell using point-to-point electrical connections using the above-mentioned bus bar assembly between the cell compartments. The current is usually taken off one electrode at several points and the connection made to the next electrode at several points by means of bolting, welding or similar types of connections and each connection must be able to pass significant current densities.

Most filter press type electrolysers insulate the anodic and cathodic parts of the cell using a variety of materials that may include metals, plastics, rubbers, ceramics and various fibre based structures. In many cases, O-ring grooves are machined into frames or frames are moulded to allow O-rings to be inserted. Typically, at least two different materials from the assembly are necessary to enclose the electrodes in the cell and create channels for electrolyte circulation, reactant feed and product removal.

WO98/29912, published Jul. 9, 1998, in the name of The Electrolyser Corporation Ltd. and Stuart Energy Systems Inc., describes such a mono-polar cell electrolyser system configured in either a series flow of current, in a single stack electrolyser (SSE) or in a parallel flow of current in a multiple stack electrolyser (MSE). Aforesaid WO98/29912 provides details of the components and assembly designs for both SSE and MSE electrolysers.

As used herein, the term "cell" or "electrochemical cell" refers to a structure comprising at least one pair of electrodes including an anode and a cathode with each being suitably supported within a cell stack configuration. The latter further comprises a series of components such as circulation frames and gaskets through which aqueous electrolyte is circulated and product disengaged. The cell further includes a separator assembly having appropriate means for sealing and mechanically supporting the separator within the enclosure and an end wall used to separate adjacent cells blocks. Multiple cells may be connected either in series or in parallel to form cell stacks and there is no limit on how many cells may be used to form a stack. A cell block is a unit that comprises one or more cell stacks and multiple cell blocks are connected together by an external bus bar. Aforesaid PCT application WO98 29912 describes functional electrolysers comprising one or more cells that are connected together either in parallel, in series, or a combination thereof.

Depending on the configuration of such a cell stack electrochemical system, each includes an end box at each end of each stack in the simplest series configuration or a collection of end boxes attached at the end of each cell block. Alternative embodiments of an electrolyser includes end boxes adapted to be coupled to a horizontal header box when both a parallel and series combination of cells are assembled.

In the operation of the cell stack during electrolysis of the electrolyte, the anode serves to generate oxygen gas whereas the cathode serves to generate hydrogen gas. The two gases are kept separate and distinct by a low permeable membrane separator. The flow of gases and electrolytes are conducted via circulation frames and gasket assemblies which also act to seal one cell component to a second and to contain the electrolyte in a cell stack configuration in analogy to a tank.

The rigid end boxes can serve several functions which include providing a return channel for electrolyte flowing out from the top of the cell in addition to serving as a gas/liquid separation device. The end box may also provide a location for components used for controlling the electrolyte level, such as, liquid level sensors and temperature, i.e. for example heaters, coolers or heat exchangers. In addition, with appropriate sensors in the end boxes individual cell stack electrolyte and gas purity may be monitored. Also, while most of the electrolyte is recirculated through the electrolyser, an electrolyte stream may be taken from each end box to provide external level control, electrolyte density, temperature, cell pressure and gas purity control and monitoring. This stream is returned to either the same end box or mixed with other similar streams and returned to the end boxes. Alternatively, probes may be inserted into the end boxes to control these parameters. An end box may also have a conduit to provide the two phase mixture to the existing liquid in the end box to improve gas liquid separation. End boxes of like type containing the same type of gas can be connected via a header such that they share a common electrolyte level.

Thus, an MSE or SSE electrolyser that produces electrolytic gases from a liquid electrolyte requires the separation of the gas and liquid phases and it also requires circulation of the liquid. If the gas and liquid are intimately mixed when the gas bubbles are small, a foam results which generally results in poor gas/liquid separation. The recirculation of gas from the end box/header into the electrode/separator gap spacing effectively increases the electrolyte resistivity and lowers the operating cell efficiency. This leads to the requirement to build larger geometry conduits in the form of end boxes with a subsequent economic penalty. However, in the operation of a water electrolytic cell that produces hydrogen and oxygen gases, it is most important that there be no mixing or intermingling of the hydrogen- and oxygen-bearing electrolyte solutions. Thus, removal of as much as possible of the entrained gases from the aqueous solution is a prime objective. Further, there is a desirable trend in cell design to minimize the sizes of cells, stacks and associated components, such as end boxes, headers and the like. Therefore, achievement of the gas/liquid separation goals as aforesaid must be satisfied in the context of reduced cell volumes. The present invention addresses the combination of these two needs.

SUMMARY OF THE INVENTION

It is an object of the present invention to provide an improved method of and apparatus for hydrogen and oxygen gas separation from aqueous electrolyte solutions in an electrolyzer.

Accordingly, in one aspect the invention provides an improved method of separating hydrogen gas entrained with a first aqueous electrolyte solution and oxygen gas entrained with a second aqueous electrolyte solution of a water electrolyser, said method comprising producing a first two-phase flow discharge of said hydrogen gas in said first solution;

producing a second two-phase flow discharge of said oxygen gas in said second solution;

feeding said first discharge to a first separation chamber having a portion defining a hydrogen chamber to effect separation of said hydrogen gas from said first discharge;

feeding said second discharge to a second separation chamber having a portion defining an oxygen chamber to effect separation of said oxygen gas from said second discharge;

collecting said hydrogen gas from said hydrogen chamber;

collecting said oxygen gas from said oxygen chamber;

collecting said first discharge;

collecting said second discharge;

the improvement wherein at least one of said first discharge is discharged into said hydrogen chamber and said second discharge is discharged into said oxygen chamber.

By the term "hydrogen chamber" as used in this specification and claims is meant the essentially hydrogen-containing space of the first separation chamber above the level of liquid in this chamber.

By the term "oxygen chamber" as used in this specification and claims is meant the essentially oxygen-containing space of the second separation chamber above the level of the liquid in the second chamber.

Thus, by discharging the two-phase flows into the respective gas chambers containing essentially only a hydrogen or oxygen-containing phase above the level of any liquid that may be present in the discharge chambers, physical parameters, such as gravity, centrifugal forces, enhanced residence time within the gas chamber, and the like, provide for more efficient gas/liquid separation. Directing the flow above any liquid level, preferably at least horizontally and, more preferably, vertically as an upwardly projecting fountain or like spray provides better separation than when the two-phase flow discharge is merely poured or merged as a stream into liquid either resident or possibly transient in the chamber or foam.

A most preferred two-phase separator system employs use of a vortex or hydro cyclone principle.

The practice of the invention as hereindefined is of particular value when the chamber is constituted as an end box, wherein the gas/liquid mixture is released near the top of the end box and horizontal head, above the liquid level. Preferably, the mixture is discharged within the end box through a suitably disposed essentially vertical "chimney" as a fountain or like spray above the much reduced gas entrained gas/liquid two phase level established in the end box or header by electrolyte circulation with the cell stack. The addition of an internal fixation within the end box in the form of a "chimney" has the advantages of:

(i) enhancing the separation of gas and liquid and improving the operating efficiency of the electrolyser by minimizing the internal resistance generated by circulation of entrapped gas in the form of bubbles;

(ii) improving the circulation of liquid flow through the end box and into the cell block to allow higher internal flow rates; and (iii) providing a mechanism to minimize the footprint of an MSE or SSE electrolyser by minimizing the cross sectional area of the end box.

In a further aspect the invention provides an improved water electrolyser for producing hydrogen and oxygen gases comprising means for producing a first two-phase flow discharge of said hydrogen gas in a first aqueous electrolyte solution;

means for producing a second two-phase flow discharge of said oxygen gas in a second aqueous electrolyte solution;

a first separation chamber having a portion defining a hydrogen chamber;

a second separation chamber having a portion defining an oxygen chamber;

means for feeding said first discharge into said first separation chamber to effect separation of said hydrogen gas from said first discharge;

means for feeding said second discharge into said second separation chamber to effect separation of said oxygen gas from said second discharge;

means for collecting said hydrogen gas from said hydrogen chamber;

means for collecting said oxygen gas from said oxygen chamber;

means for collecting said first discharge from said first separation chamber;

means for collecting said second discharge from said second separation chamber;

the improvement comprising at least one of (a) means for feeding said first discharge into said hydrogen chamber; and (b) means for feeding said second discharge into said oxygen chamber.

BRIEF DESCRIPTION OF THE DRAWINGS

The electrochemical cells and electrochemical systems constructed in accordance with the present invention will now be described, by way of example only, with reference to the accompanying drawings, wherein.

DETAILED DESCRIPTION OF PREFERRED EMBODIMENTS

Figure 1:
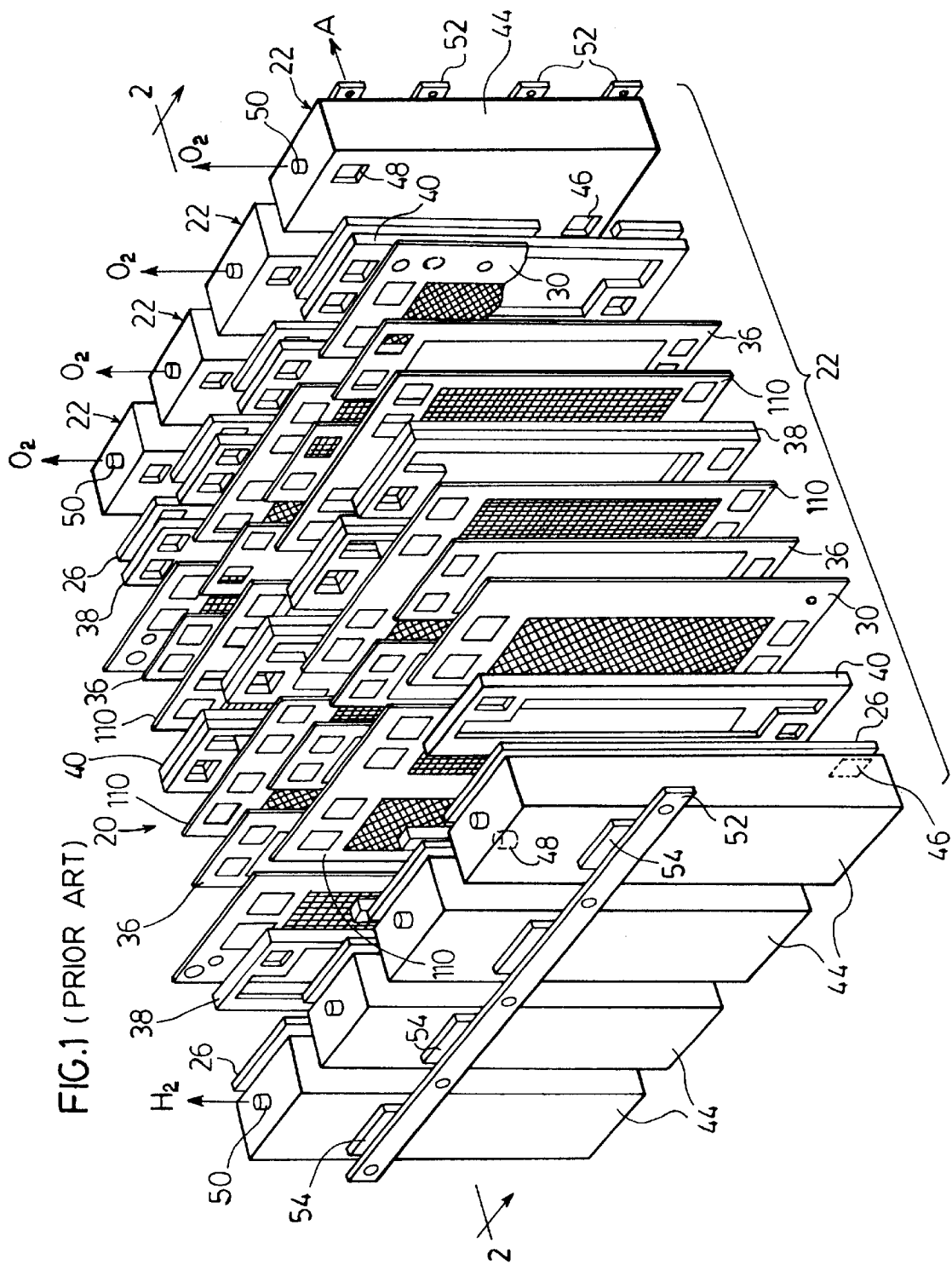
FIG. 1 is an exploded perspective view of a multiple stack electrochemical system (MSE) consisting of the series connection of four stacks consisting of two cells each connected in parallel according to the prior art.

FIG. 1 shows generally as 20 a monopolar MSE according to the prior ail as embodiment in aforesaid WO98/29912.

Electrochemical system 20 is shown as a cell block comprising foul cell stacks 22 with series connections between cell stacks and the two electrolysis cells of each stack connected in parallel.

Each stack 22 comprises two cells having two anodes 110 and two cathodes 30. In each compartment an anolyte frame 38 is located adjacent to anodes 110 to define an anolyte chamber and a catholyte frame 40 is located adjacent to cathodes 30 defining a catholyte chamber. Anolyte frame 38 is essentially identical in structure to catholyte frame 40 and may be generally referred to as electrolyte circulation frames.

Each anode and cathode chamber in a given cell is separated by a separator 36 to reduce mixing of the different electrolysis products, namely oxygen and hydrogen, produced in the respective anode and cathode chambers.

Electrochemical system 20 includes an end box 44 at each end of each stack 22. Referring specifically to FIG. 1, each end box 44 is provided with a lower aperture 46 and an upper aperture 48 in the side of the box in communication with the respective anolyte or catholyte chamber. A gas outlet 50 at the top of each box 44 provides an outlet for collecting the respective gas involved during the electrolysis reaction. Cell stacks 22 and entire cell block 20 are held together with sufficient force so that a fluid tight seal is made to prevent leaking of electrolyte or gases. The use of a rigid structural element such as a rectangular tube used to form end box 44 with clamping bars 52 and tie rods and associated fasteners (not shown) provides an even load distributing surface to seal the stacks 22 at modest clamping pressures. Electrically insulating panels 54 are sandwiched between the outer surfaces of end boxes 44 and clamping bars 52 in order to prevent the end boxes from being electrically connected to each other by the clamping bars.

An insulating planar gasket 26 is disposed at the end of each stack between electrolyte frames 38 or 40 and end boxes 44 for insulating the face of end box 44 from contact with electrolyte. Gasket 26 is provided with an upper aperture and a lower aperture (not shown) in registration with apertures 48 and 46, respectively, in end box 44 for fluid circulation.

It will be understood that known electrochemical systems may be modified to include the end boxes disclosed herein by way of retrofit.

For electrolysis cells used in electrosynthesis, a liquid can be fed forward from one cell block to the next cell block between adjacent boxes in order to assist conversion per pass. End boxes 44 may be manufactured form a variety of material suitable for alkaline or acid based electrochemical systems including steel, stainless steel, nickel or plastics with, if necessary, appropriate reinforcements.

Figure 2:
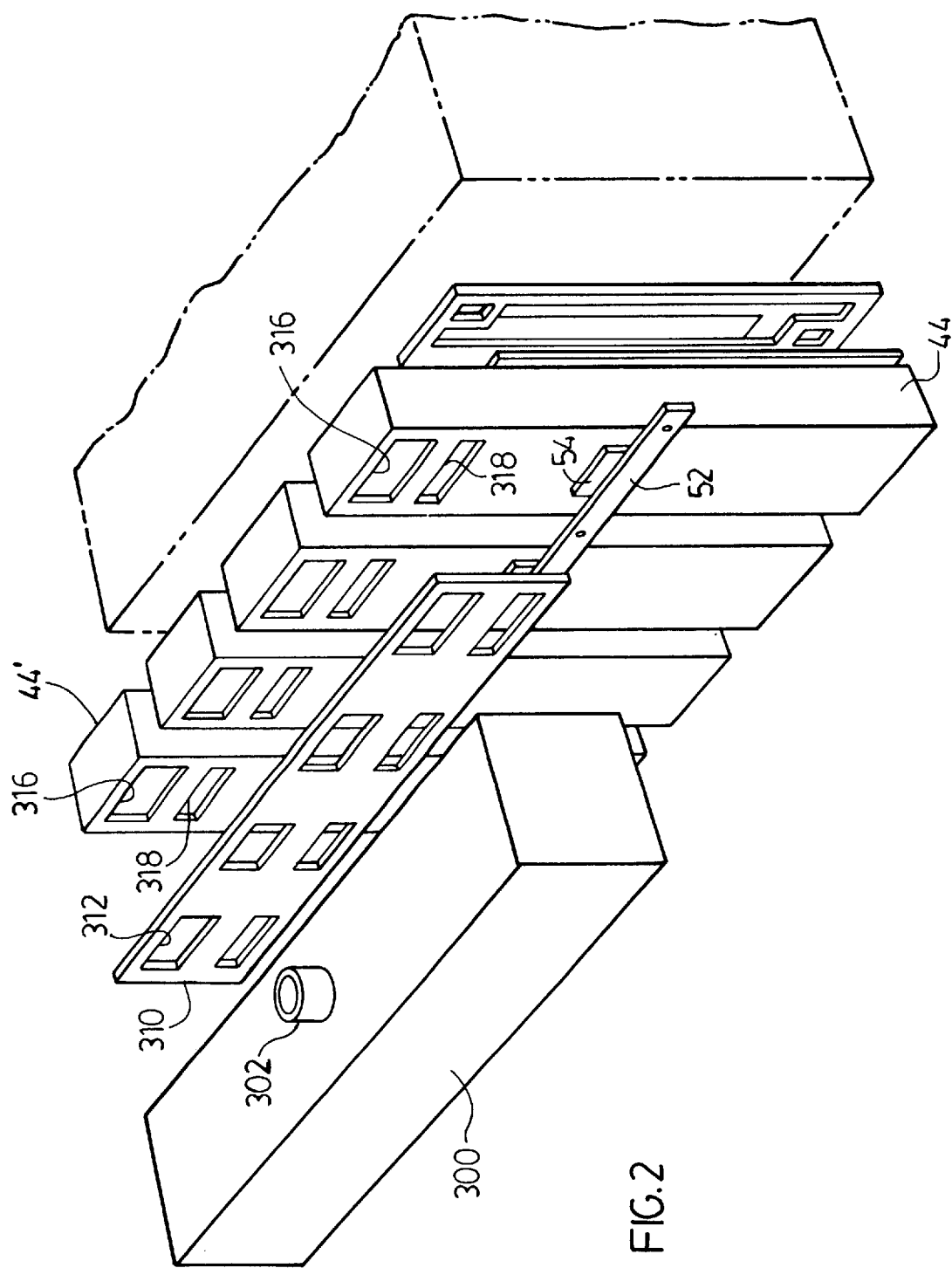
FIG. 2 is a perspective, exploded view, in part, of an MSE electrolyser having a plurality of end boxes and a header box according to the prior art.

With reference to FIG. 2, an alternative embodiment of an MSE electrolyser includes end boxes 44 adapted to be coupled to a horizontal header box 300 having a vent 302 for product gas. End boxes 44 are provided with upper and lower apertures 316 and 318 respectively. A gasket 310 with spaced pairs of upper and lower apertures 312 and 314 respectively is sandwiched between header box 300 and end boxes 44.

Figure 3:
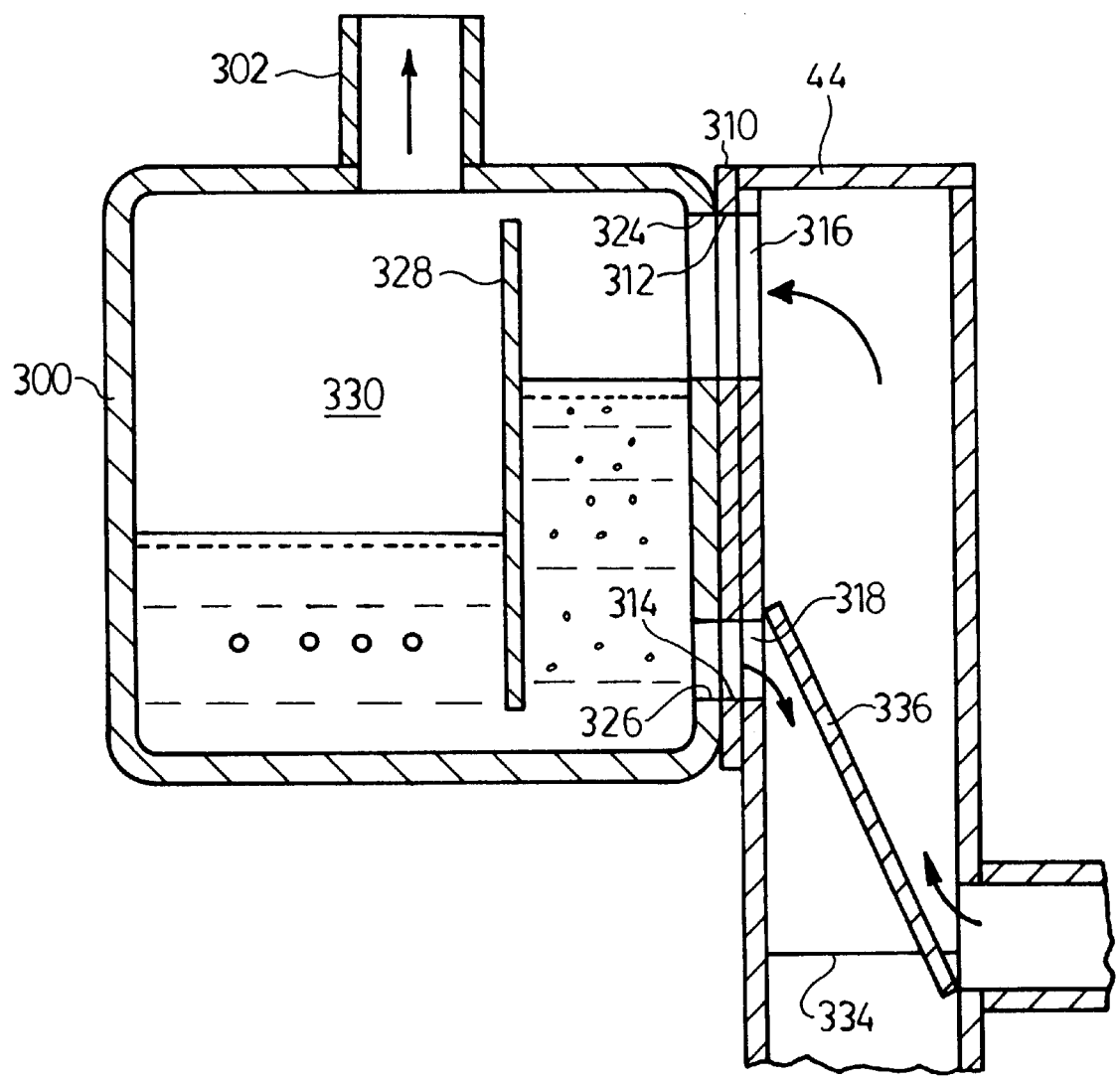
FIG. 3 is a cross sectional view of an end box attached to part of the MSE electrolyser of FIG. 1 according to the prior art.

With reference also to FIG. 3, when header box 300 is secured to end boxes 44, spaced upper and lower apertures 324 and 326 of header box 300 are in registration with apertures 312 and 314, respectively, in gasket 310 and apertures 316 and 318 in end boxes 44. A baffle 328 is used to reduce or prevent electrolyte directly entering chamber 330 of header box 300 or cooling the electrolyte. Barrier plates 336 in end boxes 44 ensure that the two-phase fluid exiting the electrolyser stack is directed up to the inlet into header box 300.

Following the arrow indicating direction of fluid flow, gas-laden electrolyte spills into end box 44 from the upper fluid passageways of the cell block and rises in end boxes 44 where it enters header box 300 through the upper entrance ports defined by apertures 316, 312 and 324 in registration. The electrolyte with product gases separated out is recycled back to end box 44 through the lower exit port defined by apertures 318, 314 and 326. The electrolyser including header box 300 advantageously provides mixing of electrolyte between cell stacks of the MSE thereby preventing chemical gradients from building up across the electrolyser. Further, this design permits control of both electrolyte levels 334 and electrolyte temperature in the multiple stacks at only one location.

On shutdown, electrolyte flows back into each end box 44 thereby breaking the liquid, electrolyte circuit between cell stacks. In addition, the use of header box 300 eliminates the need to pump electrolyte into the electrolyser from a separate holding tank, and advantageously avoids dangerously low liquid levels occurring in the electrolyser during shutdown of the electrolyser.

Figure 4:
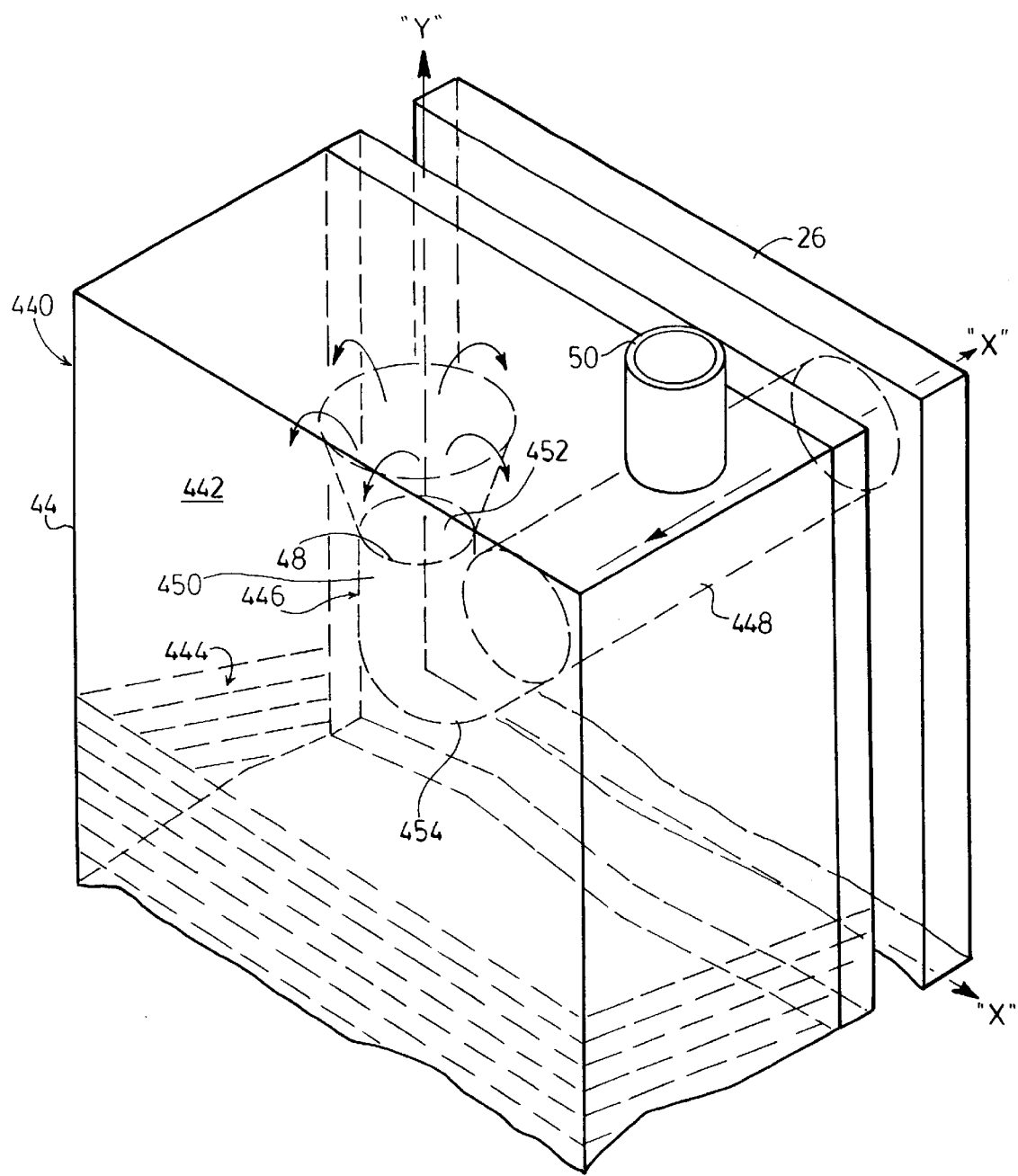
FIG. 4 is a perspective diagrammatic view of an end box incorporating a chimney according to the invention.

With reference now to FIG. 4, this shows the tipper half of end box 44 generally as 440 having a hydrogen collection vent pipe 50 offset from the centre of the top of box 44. Upper half 440 constitutes an upper portion defining a hydrogen separation chamber 442 and a lower portion defining a catholyte-receiving chamber 444.

Disposed centrally within chamber 442 is a right-angled discharge chimney 446 integrally formed with hydrogen/catholyte feed conduit 448 in communication with catholyte chamber within frame 40.

Separation chamber 440, hydrogen chamber 442 and catholyte-receiving chamber have respective horizontal and vertical axes, "X and Y", respectively.

Chimney 446, more specifically, has a vertically aligned portion 450, having an outlet 452, and an integrally formed horizontal portion 454.

Chamber 442 contains essentially single phase hydrogen gas emanating from the hydrogen/catholyte two-phase mixture discharged into the essentially non-liquid containing chamber 442. The catholyte discharged into chamber 442 falls under gravity to the essentially liquid containing chamber 444, having a much reduced entrained gas liquid two phase level established in the end box by electrolyte circulation within the cell stack.

In operation, the two-phase mixture from feed conduit 448 discharges through outlet 452 of chimney 446 in an essentially vertical, upward direction as a fountain or spray. The discharge thus enters hydrogen chamber 442 at an angle of 90°, and essentially parallel to the vertical axis of chamber 442.

Thus, the two-phase fluid is discharged in a direction and manner distinct from the direction and manner described in relation to FIG. 3 of the prior art in that the two-phase discharge of the latter is merely poured at best, horizontally, with immediate initial downward movement under gravity of both entrained gas and liquid in the bulk of the liquid within the chamber 314, of FIG. 3 analogous to chamber 444 of FIG. 4.

Clearly, it can be seen with reference to FIG. 3, that entrapped hydrogen bubbles are initially carried downward with the bulk liquid and must rapidly overcome the current flow to escape into hydrogen chamber 330 over the top of baffle 328. In sharp contrast, the embodiment of FIG. 4 shows that it is the combined gas/liquid-stream as a whole that has the upward momentum, which facilitates separation of the gas and liquid, with reduced impedance by the liquid, particularly when the latter is in the form of a spray or fountain.

Figure 5:
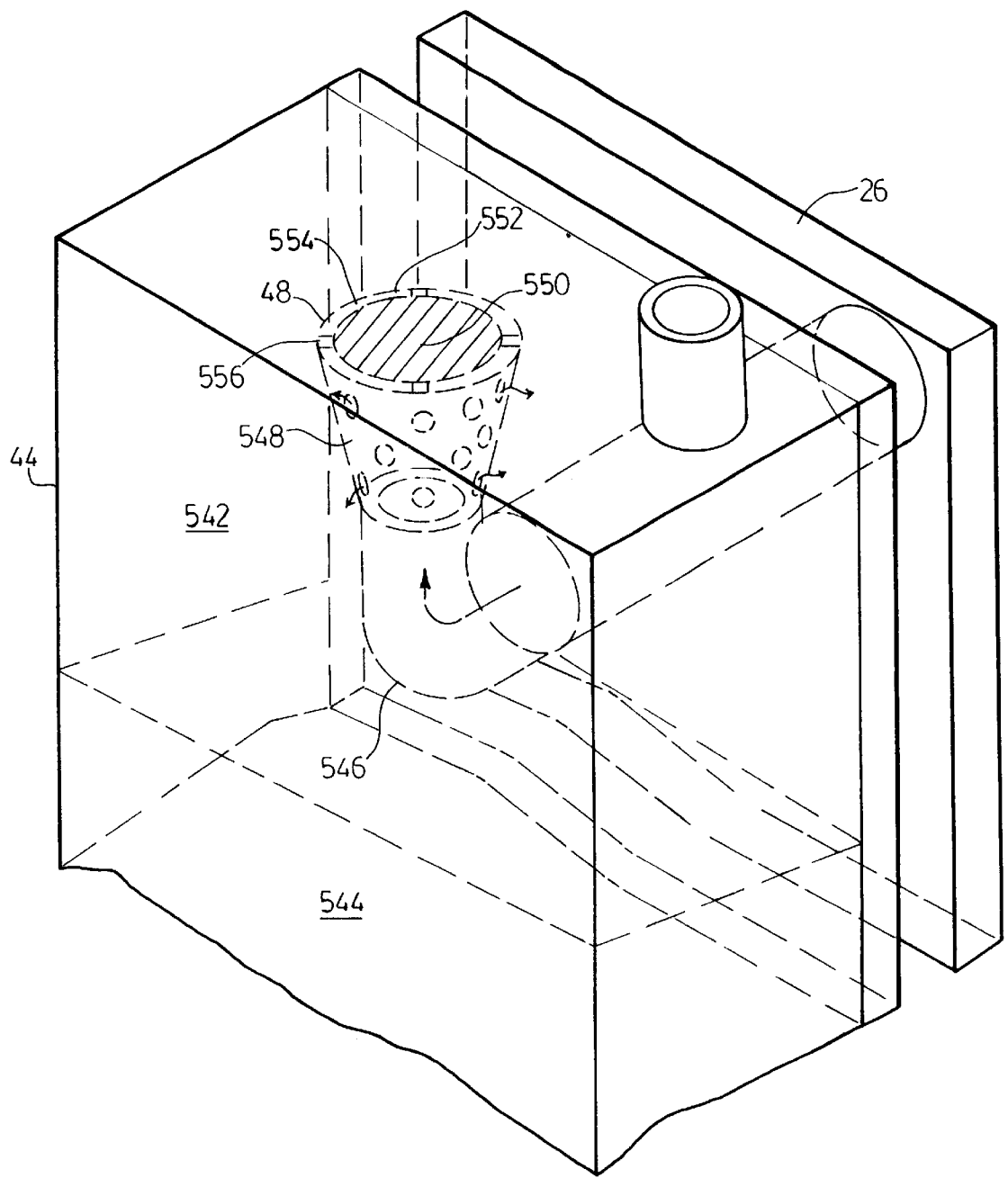
FIGS. 5 and 6 represent perspective views of end boxes containing alternative-shaped chimneys according to the invention.

FIG. 5 shows a more preferred embodiment wherein end box 44 has a similarly located chimney 546 having a terminal portion 548 defining an inverted frustoconical chamber 552 and a vertical axis "Y" parallel to the vertical axes of hydrogen chamber 542 and returning liquid chamber 544. Within chamber 552 is an inner solid frustoconical member 550 concentric with portion 548 and symmetrically disposed therefrom to define a frustoconical passage 554 therewith. Member 550 is positioned and retained with chamber 552 by four fasteners 556. Terminal portion 548 has a plurality of small apertures 556 to constitute a perforated or "cullender-like" member.

Thus, in operation gas-entrained catholyte exits passage 552 under a vortex motion as a vertical helical flow to provide enhanced residence time for the two phases to separate within hydrogen chamber 542.

Figure 6:
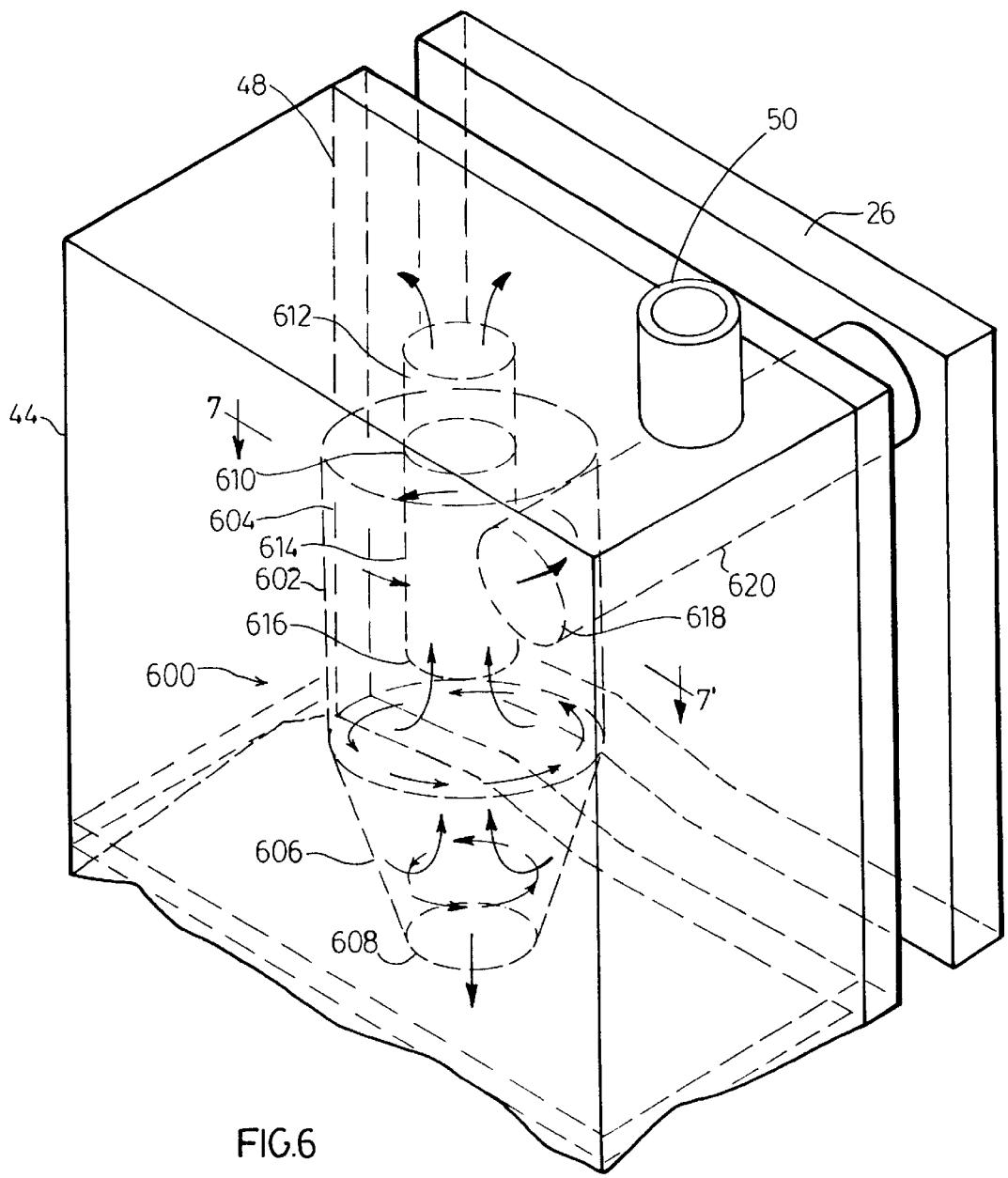
Figure 7:
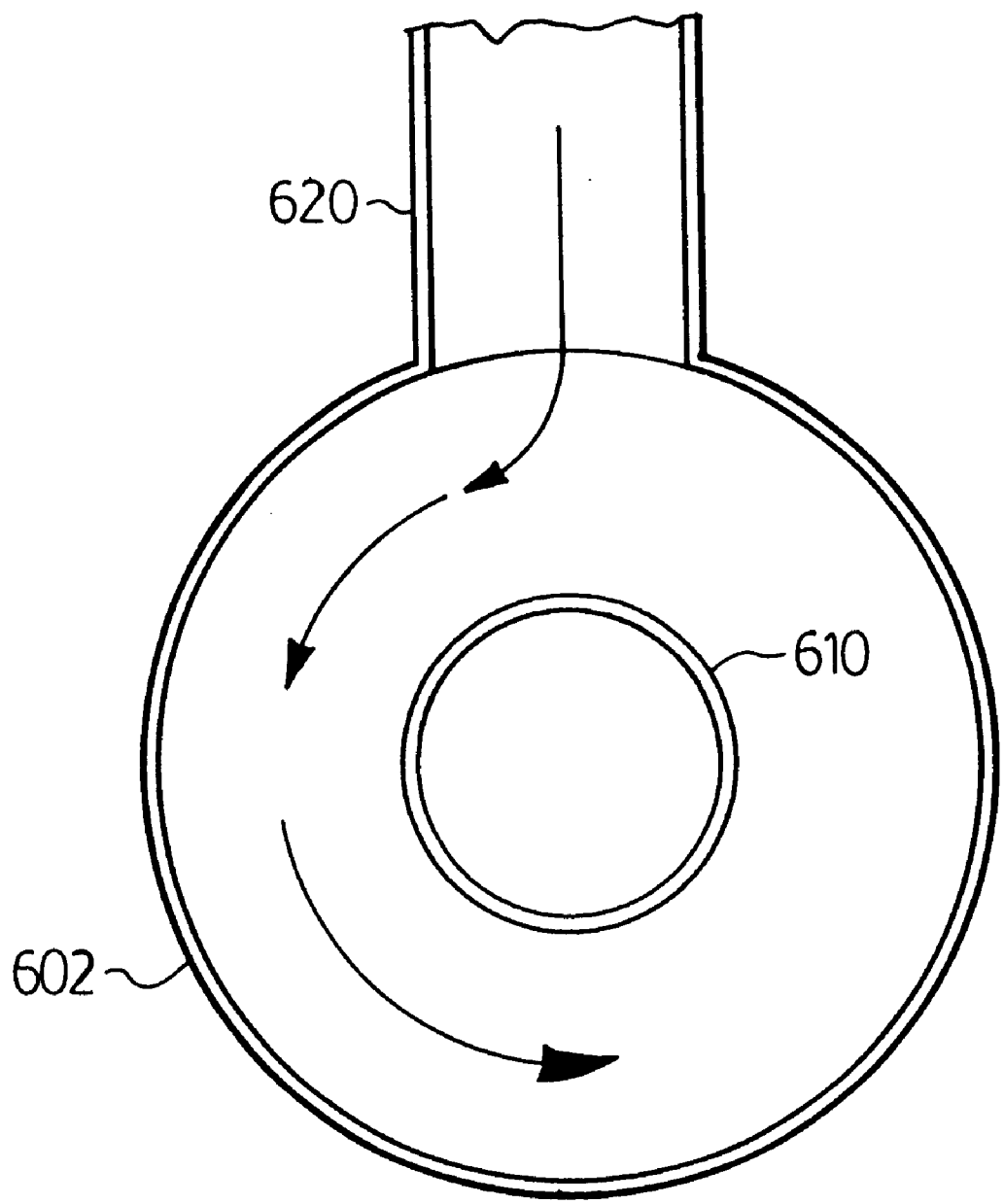
FIG. 7 is a diagrammatic plan view (in part) along line 7–7' of FIG. 6; and wherein the same numerals denote like parts.

With reference now to FIG. 6 and FIG. 7, end box 44 has a chimney shown generally as 600 comprising a hollow right-vertical cylinder 602 having an upper portion 604 and an integrally formed hollow inverted frustoconical portion 606 having a terminal portion defining an outlet 608. Coaxial within cylinder 602 is a hollow right vertical inner cylinder 610 having an upper portion 612 extending out of and above portion 604 and a lower portion 614 terminating above frustoconical portion 606 and defining an inlet 616. Cylinder 602 has a peripheral portion defining an essentially circular inlet aperture 618 formed with chordally disposed catholyte conduit 620. Lower portion 620 of aperture 618 is essentially in line with the horizontal plane of inlet 616. Chimney 600 constitutes a hydrocyclone wherein two-phase catholyte flow out of conduit 616 is converted into rotational flow within chamber 613 by the off-set introduction of the catholyte. The combined effects of induced centrifugal and gravitational forces act to provide enhanced gas/liquid separation in consequence of the liquid dropping to and exiting 608 and the gas entering cylinder 610 through inlet 616 and exiting out of outlet 610. The arrows denote general gas (broad) and liquid (narrow) flows in the hydrocyclone.

Although the aforesaid embodiments of FIGS. 4–6 have been described in regard to separation of hydrogen from catholyte, it can be readily seen that the embodiment is equally applicable mutatis mutandis to oxygen-anolyte separation.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. An improved method of separating hydrogen gas entrained with a first aqueous electrolyte solution and oxygen gas entrained with a second aqueous electrolyte solution of a water electrolyser for producing said hydrogen and said oxygen, said method comprising producing a first two-phase flow discharge of said hydrogen gas in said first solution;

producing a second two-phase flow discharge of said oxygen gas in said second solution;

feeding said first discharge to a hydrogen first separation chamber having a horizontal axis and having a portion defining a hydrogen chamber comprising a hydrogen-containing space within said first separation chamber above the level of liquid in said hydrogen first separation chamber, said discharge being within said hydrogen-containing space above said level of liquid to effect separation of said hydrogen gas from said first discharge;

feeding said second discharge to an oxygen second separation chamber having a horizontal axis and having a portion defining an oxygen chamber comprising an oxygen-containing space within said second separation chamber above the level of liquid in said oxygen second separation chamber to effect separation of said oxygen gas from said second discharge;

collecting said hydrogen gas from said hydrogen chamber;

collecting said oxygen gas from said oxygen chamber;

collecting said first discharge from a first end box or header;

collecting said second discharge from a second end box or header;

the improvement wherein said hydrogen first separation chamber is within said first end box or header and further comprises a two-stage separation process comprising discharging said first discharge at an angle above and greater than the horizontal axis of said hydrogen chamber and essentially upwardly parallel to the vertical axis of said hydrogen chamber as a cyclonic first separation stage to provide a cyclonic discharge, and directing said cyclonic discharge to a second separation stage within said first end box or header and collecting said first discharge from said end-box or header.

2. A method as defined in claim 1 comprising discharging said first discharge into said hydrogen chamber.

3. A method as defined in claim 1 comprising discharging said second discharge into said oxygen chamber.

4. A method as defined in claim 1 comprising hydrocycloning said first discharge within said hydrogen chamber.

5. An improved water electrolyser for producing hydrogen and oxygen gases comprising:

chamber selected from a hydrogen end box and a hydrogen header;

means for producing a first two-phase flow discharge of said hydrogen gas in a first aqueous electrolyte solution;

means for producing a second two-phase flow discharge of said oxygen gas in a second aqueous electrolyte solution;

a hydrogen first separation chamber having a portion defining a hydrogen chamber having a vertical axis and a horizontal axis and comprising a hydrogen-containing space above the level of liquid in said first separation chamber;

an oxygen second separation chamber having a portion defining an oxygen chamber comprising an oxygen-containing space within said second separation chamber above the level of liquid in said second separation chamber;

means for feeding said first discharge into said hydrogen first separation chamber to effect separation of said hydrogen gas from said first discharge;

means for feeding said second discharge into said oxygen second separation chamber to effect separation of said oxygen gas from said second discharge;

means for collecting said hydrogen gas from said hydrogen chamber;

means for collecting said oxygen gas from said oxygen chamber;

means for collecting said first discharge from said first separation chamber;

means for collecting said second discharge from said second separation chamber;

the improvement wherein said hydrogen first separation chamber is within said first end box or header; and further comprising (a) means for feeding said first discharge into said hydrogen-containing space at an angle greater than and above said horizontal axis and essentially upwardly parallel to said vertical axis as a cyclonic separation to provide a cyclonic discharge and directing said cyclonic discharge within said end box or header and collecting said first discharge from said end box or header; and (b) means for feeding said second discharge into said oxygen-containing space.

6. An electrolyser as defined in claim 5 comprising means for feeding said first discharge into said hydrogen chamber.

7. An electrolyser as defined in claim 5 comprising means for feeding said second discharge into said oxygen chamber.

8. An electrolyser as defined in claim 5 wherein said oxygen chamber has an oxygen chamber horizontal axis and an oxygen chamber vertical axis and means for feeding said second discharge at an angle greater than and above said oxygen chamber horizontal axis.

9. An electrolyser as defined in claim 8 comprising means for feeding said second discharge essentially parallel to said oxygen chamber vertical axis.

10. An electrolyser as defined in claim 5 wherein at least one of said first and second separation chamber constitute an end box.

11. An electrolyser as defined in claim 5 wherein at least one of said first and second separation chambers constitute a header.

12. An electrolyser as defined in claim 5 comprising hydrocyclone means within said hydrogen chamber.

* * * * *